Jan. 20, 1953  J. T. CLARK ET AL  2,626,312
ELECTRICAL SCORING GAME
Filed Nov. 29, 1948  4 Sheets-Sheet 1
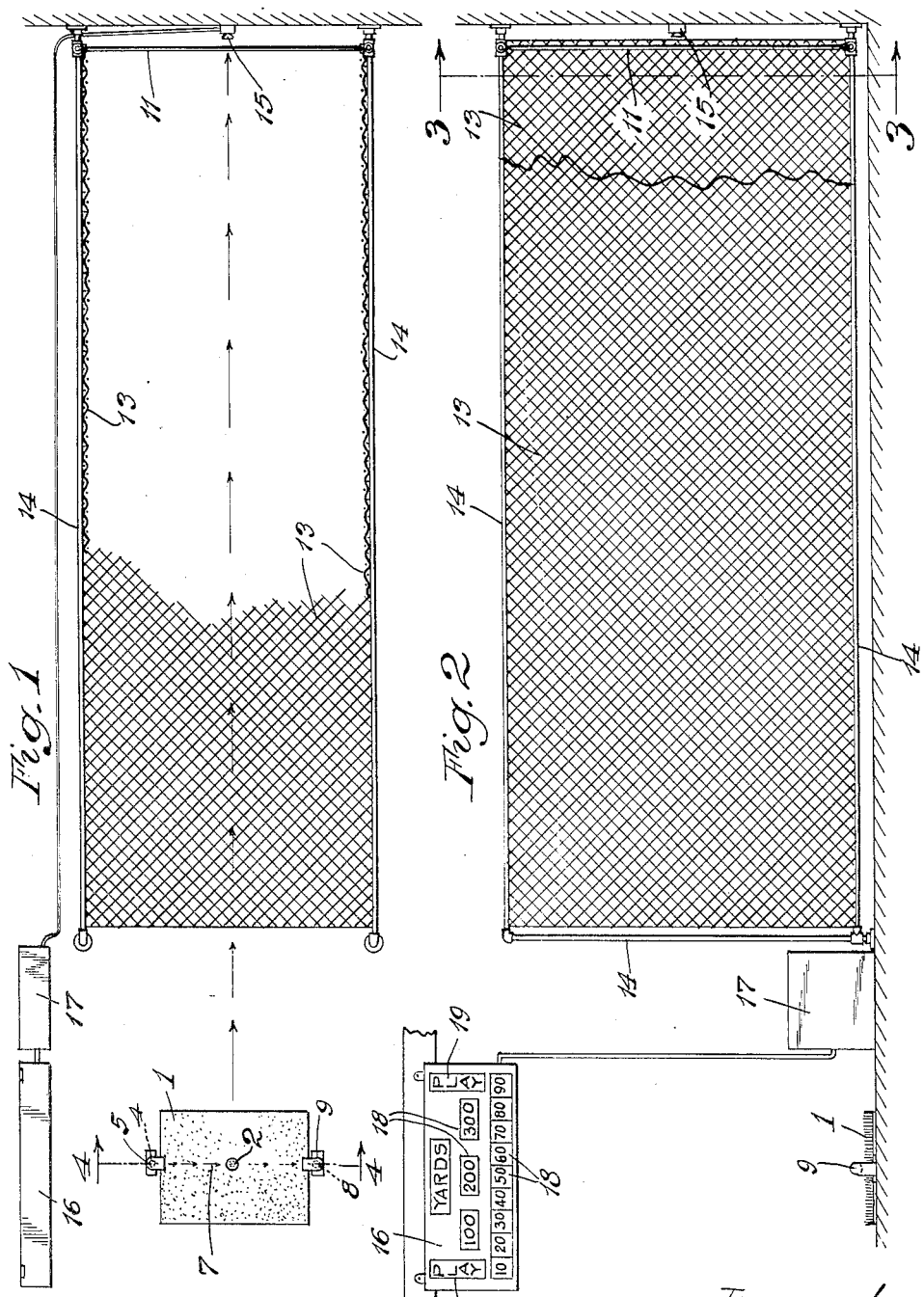
Inventors
John T. Clark
Oliver J. Schommer
by Parker & Carter
Attorneys Jan. 20, 1953    J. T. CLARK ET AL    2,626,312
ELECTRICAL SCORING GAME
Filed Nov. 29, 1948    4 Sheets-Sheet 2

Inventors
John T. Clark
Oliver J. Schommer
by Parker & Carter
Attorneys.

Jan. 20, 1953   J. T. CLARK ET AL   2,626,312
ELECTRICAL SCORING GAME
Filed Nov. 29, 1948   4 Sheets-Sheet 3

Inventors
John T. Clark
Oliver J. Schommer
by Parker + Carter
Attorneys.

Jan. 20, 1953　　　J. T. CLARK ET AL　　　2,626,312
ELECTRICAL SCORING GAME
Filed Nov. 29, 1948　　　　　　　　　　　　4 Sheets-Sheet 4

Inventors
John T. Clark
Oliver J. Schommer
by Parker & Carter
Attorneys

Patented Jan. 20, 1953

2,626,312

UNITED STATES PATENT OFFICE 2,626,312

ELECTRICAL SCORING GAME

John T. Clark, Cicero, and Oliver J. Schommer, Melrose Park, Ill.; said Schommer assignor to said Clark Application November 29, 1948, Serial No. 62,573

5 Claims. (Cl. 175—381)

This invention relates to a game device. In the particular form herein shown, it relates primarily to a game or instruction device in which a ball or other equivalent member is projected or driven and in which automatic means are provided to indicate the distance which the member would have moved in free flight or free movement.

One object is to provide means for indicating and registering the distance which a golf ball would have traveled in free flight.

Another object is to provide an indoor golf game in which a golf ball is driven against a back stop and to provide in connection with such an arrangement, means for indicating the distance the ball would have traveled had its movement not been interrupted by contact with the back stop.

Another object is to provide an electronic means for measuring the time of movement of a member moving through the air or along the ground.

Another object is to provide an electronic means and method for measuring the time during which a member is in motion and for indicating the approximate distance which the said member should have moved while in motion during the time measured.

A further object is to provide an electronic means for measuring the time required for the object to move a short, limited distance and translating said time period into an indication approximately equal to the distance the object would have traveled in free space.

Other objects will appear from time to time throughout the specification and claims.

This application is a continuation-in-part of our co-pending application Serial No. 707,856, filed November 5, 1946, now abandoned.

The invention is illustrated more or less diagrammatically in the accompanying drawings, wherein:

Figure 1 is a plan view of one form of the device;

Figure 2 is a side elevation of the device with parts broken away;

Like parts are designated by like characters throughout the specification and drawings.

In the particular form herein shown, the invention is designed for use as a golf game in which the golf ball is driven in the usual manner and is stopped by a canvas, net or other back stop member. Other sorts of counters and balls might be driven, and the device is not limited to a golf game.

Figure 4:
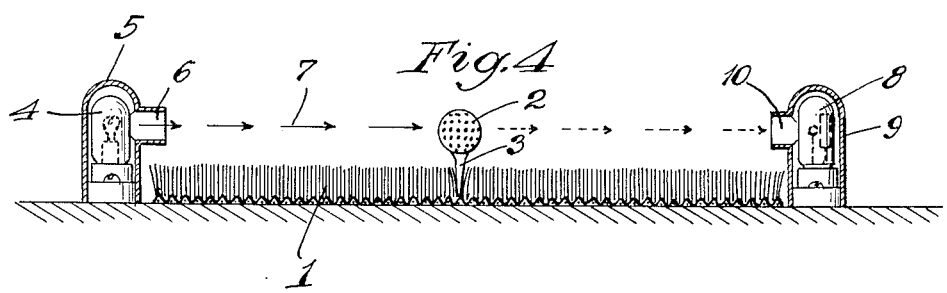
Figure 4 is a section taken on an enlarged scale at line 4—4 of Figure 1.

As shown, a member 1, which may be of fibrous or flexible material, is used as a placement means for the ball. As shown, a golf ball 2 is placed on a tee 3, which is inserted in or supported by the member 1. A source of light 4 is positioned in a housing 5 and is provided with an opening 6 through which a beam of light 7 is directed toward a photoelectric cell 8 in a housing 9 having an opening 10. Before playing the ball is positioned, as shown in Figures 1 and 4, and interrupts the beam of light and prevents it from falling upon the cell 8. When the ball has been driven, the beam of light, no longer interrupted by the ball, falls upon the electric cell and actuates the mechanism which will be described below.

Preferably, the ball is driven against a member 11, which may be a sheet of canvas or other relatively flexible material which is held tightly in position. The member 11 is provided with a target formation 12, and the area into which the ball is driven is surrounded by netting 13, which is held in place by any convenient means. It may be fastened to the walls of a building or a room or may be supported on a framework 14. In the particular form herein shown, the framework is formed of pipe-like members, but any suitable means of supporting the netting and the member 11 may be used.

Adjacent, and preferably immediately behind the member 11 is a microphone 15. The microphone is affected by the sound caused by the impact of the ball or other member upon the member 11 and actuates a stopping and counting mechanism and initiates the movement of a distance indicating device. The indicating and counting mechanism may be mounted in any suitable enclosure. As shown, it is enclosed in the members 16 and 17. The member 16 includes, as shown in Figure 2, visual means for recording the distance the ball or counter would have been driven in free flight. As shown in Figure 2, the numbered members 18 are positioned, and these are preferably illuminated by means which will be described below, and when illuminated they indicate the distance which the ball would have been driven.

Preferably illuminated members 19 may also be associated with the housing or members 16, and they are illuminated to display the word "play." This illumination takes place when the device is in condition for use so that the player or operator may know that the device is ready for operation and that a play may be made.

Figure 5:
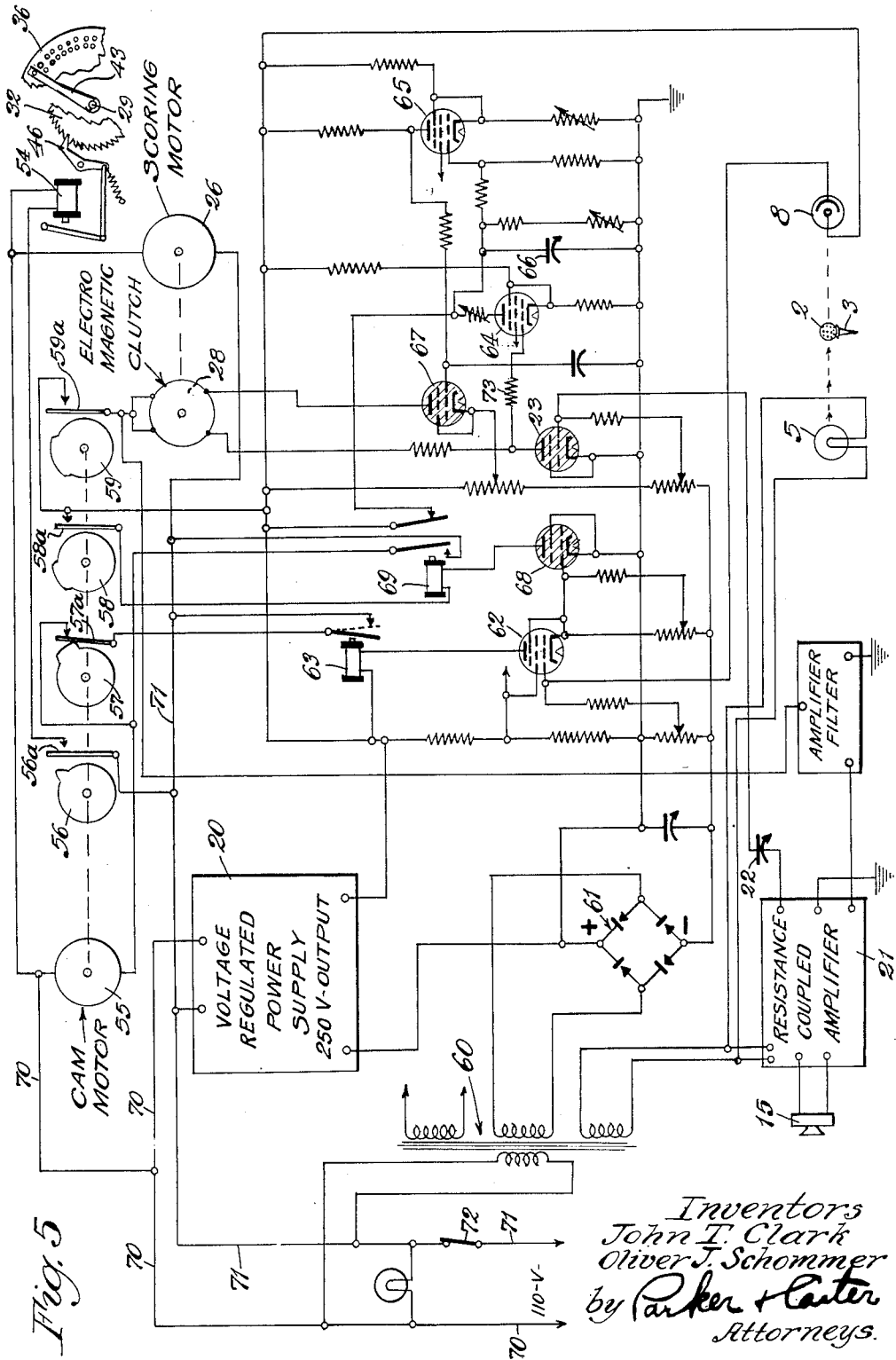
Figure 5 is a schematic diagram of one form of an electric circuit.

The electric mechanism for counting and indicating the movement of the ball is illustrated diagrammatically in Figure 5. This is only one suitable means for counting and indicating. Other means might be used, and the invention is not limited to any particular means.

The electric mechanism illustrated herewith includes the following general elements or assemblies:

1. A direct current regulated power supply;
2. A regulated alternating current transformer;
3. A sound amplifier;
4. A program switch;
5. A scoring mechanism;
6. A photoelectric starting control circuit;
7. A starting and discharging firing circuit; and
8. Stop and scoring circuits.

The members or assemblies above referred to are described more in detail below.

A direct current voltage regulated supply is indicated at 20. Such devices are well-known and available today on the market and need not be described in detail. This power supply furnishes a constant voltage to the resistance coupled amplifier 21. Such amplifiers are also well-known and available on the market, and the details of the amplifier are not given.

The amplifier 21 acts as a sound amplifier and is coupled to the microphone 15. It is preferably a standard two stage resistance coupled amplifier. Such amplifiers are well-known on the market and need not be shown or described in detail. Its output is coupled through a capacitator 22 to the grid of a tube 23 which is used to start the scoring clutch operating mechanism.

The clutch mechanism includes a clutch plate 24 fixed on the shaft of a motor 26. The clutch also includes a plate 27 upon which one or more magnets 28 are fixed. The motor 26 is a synchronous motor and the clutch magnets include two sets of windings, so connected in the circuit with the tube 23 that when one set of windings is energized the clutch is engaged with the synchronous motor 26. If both sets of windings of the clutching magnets are energized the effect is to reduce the magnetism to zero and to disengage the clutch. The details of this circuit, which are shown in Figure 5, will be described below.

The clutch plate 27 is fixed on the shaft 29 which carries contact rings 30. Brushes not shown are arranged to engage these contact rings to complete the circuit to the magnet windings. The shaft 29 is supported in bearing members 31, 31 and carries at its outer end a ratchet 32. A spring 33 has one end fixed to one of the members 31, as at 34, and has its other end fixed to the ratchet 32, as at 35, and the spring serves to return the mechanism to the starting position.

Positioned about the shaft 29 and fixed to one of the bearing supports 31 is a disc-like member 36 of insulating material. This disc is shown in side elevation in Figure 8 and in greater detail in Figure 6. The disc carries or has mounted upon it or formed within it a plurality of contact points 37, 38, 39 and 40. The conductors or wires are joined to the contact points and to the indicating lights and to a source of electrical current. The contact points 40 are connected by suitable wiring to lights numbered from 10 to 90, inclusive. Such lights are indicated at 41.

The contact points of the series 40 comprise a single series, while the contact points of the series 39, 38 and 37 are multiple series. The series 39 has a second series 39a. All of the contact points of the series 39 are connected to the light marked 100 and the contact points of series 39a are connected, respectively, to the lights marked 10 to 90 by the conductors 42. The series 38 and 37 are generally similar to 39. The series 38 thus has a multiple series of contacts 38a which are connected to the lights numbered 10 to 90, inclusive, and a single conductor which is connected to the light marked 200.

The contact points of series 37 are all connected to a conductor which is connected to the light marked 300, and a shorter series of multiple contacts 37a is associated with the contacts 37, and these are connected only to the lights marked 10, 20 and 30.

A contact arm 43 mounted on the shaft 29 and rotating about it is positioned to be moved into contact with the various contact points above mentioned. When it moves over the contact points of series 40 it contacts only a single point at a time, and the several contacts are separate from each other. When it moves over the contacts of series 37, 38 and 39, it contacts only a single point at a time, but within each of the last-mentioned series the points are themselves connected to each other. In addition to contacting the points of the series 37, 38 and 39 the switch 43 also contacts a single point of the supplemental series 37a, 38a and 39a, and thus the switch in moving over the contacts of series 40 will energize one light at a time, while in moving over the contacts of the other series it will energize two lights at a time.

Figure 6:
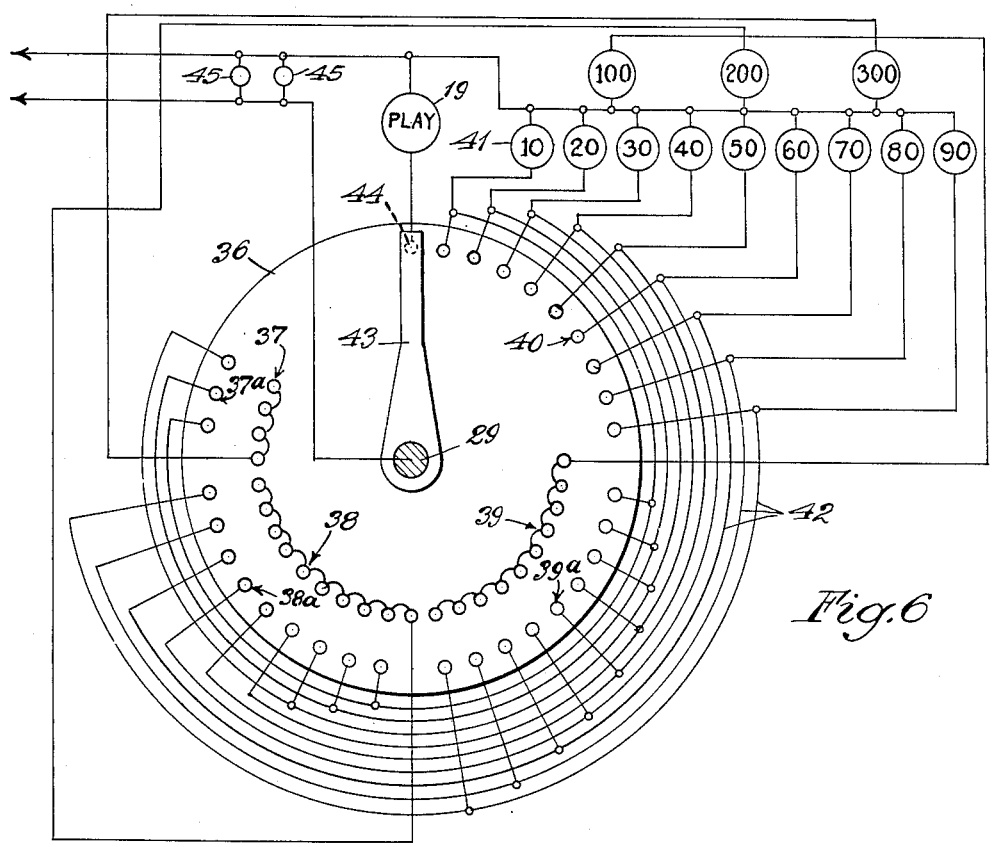
Figure 6 is a schematic diagram of the counting mechanism.

When the switch is in the position of Figure 6 it is in contact with the contact member 44 which completes the circuit to one or more of the lights 19, indicating that the apparatus is in condition for play. If desired, additional lights 45 may be in the same circuit, and they may, for example, illuminate the word "yards" which appears in Figure 2.

Figures 7, 8:
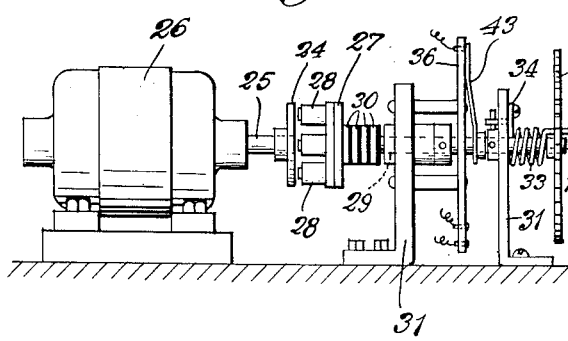
Figure 7 is a side elevation of the counting mechanism.
Figure 8 is an end view of Figure 7.

The counting reset mechanism is illustrated in Figure 8 in which the ratchet 32 and the disc 36 appear. As there shown the pawl 46 is mounted for rotation on a bearing 47 and is provided with a nose or projection of proper size to engage the teeth of the ratchet 32. The pawl is effective to retain the ratchet in the position in which it stops. An armature 48 is pivoted, as at 49, on a support 50.

A link 51 connects the free end of the armature 48 with an extension 52 of the pawl 46. A spring 53 is biased to hold the pawl in engagement with the teeth of the ratchet 32. An electromagnet 54, when energized, draws the armature 48 in a counterclockwise direction from the position shown in Figure 8 and, through the link 51, rotates the pawl out of engagement with the teeth of the ratchet 32 and thus frees the spring 33 for returning the switch 43 to its initial position, as shown in Figure 6. A suitable stop not shown may be provided to insure accuracy in the return positioning of the switch 43.

There is shown at the top of Figure 5 a cam motor 55 which preferably is a synchronous motor and carries four cams 56, 57, 58 and 59. Each cam actuates a switch 56a, 57a, 58a and 59a, respectively.

The circuit includes a regulating transformer 60 connected to a rectifier 61. The transformer maintains a constant output voltage, for example, with variations of line voltage from 95 to 125 volts. The invention, however, is not limited to a transformer of just this capacity. Any suitable transformer based on the particular design of circuit may be used within the contemplation of the invention.

The photoelectric control circuit which includes the light source 5 and the photoelectric cell 8 is connected to a pentode amplifier tube 62 which controls a relay 63. The circuit is governed by the presence of the ball 2.

The discharging and scoring circuit includes a tube 64 containing a grid, a pentode tube 65 and a timing condenser 66. The tube 64 is used for starting the sequence after the ball 2 has been driven and after the light from the light source 5 has thus been permitted to fall upon the photoelectric cell 8. The pentode tube is used to discharge the timing condenser 66 while the ball is in flight or movement.

The stop and scoring circuit includes a stop tube 67 which is a gas filled control tube and thus used to energize the neutralizing windings of the clutch magnets 28. This stop tube is operated by the pentode tube 65, which is known as a time tube and which changes the currents flowing through it in accordance with the axis of the timing condenser 66.

68 is a gas filled tube having a control grid, which tube is connected to the relay 69 which has two contacts, as shown in Figure 5, one normally closed and one normally open.

The device of the invention is generally connected to a source of electricity and includes two lines 70 and 71. A switch 72 may be included to turn the entire device off or on.

Although we have shown an operative form of our invention, it will be recognized that many changes in the form, shape and arrangement of parts can be made without departing from the spirit of the invention, and our showing is therefore to be taken as, in a sense, diagrammatic.

The use and operation of the invention are as follows:

If it be assumed that the switch 72 is closed, that the system is ready for play and that as a result of previous play a score has been set up on the indicating device shown in Figure 2, the parts are in the following position: The contact 57a is closed while the other contacts driven by the motor 55 are open. The ball for the new play is not yet in place and the light from the source 5 falls upon the photoelectric cell 8 and energizes the pentode 62, and the relay 63 is thus energized to open its contact to the position shown in Figure 5. Tubes 23, 67 and 68 are de-energized since the switches 58a and 59a are open. The scoring indicator lights will be energized, showing the score from the last play.

Assuming now that a new play is to take place, the ball 2 is placed on the support 3 and interrupts the light passing from the source 5 to the cell 8, thus increasing the resistance within the photoelectric cell 8 which in turn causes the grid of the pentode tube 62 to change in the negative direction, thus de-energizing the relay 63 and closing the circuit through its switch, which causes the cam motor 55 to be energized.

The circuit through the motor is from line 70 to switch 57a, the switch of relay 63 and back to line 71, thus causing the motor to operate for a short period and closing the switch 56a to energize the electromagnet 54 which moves the pawl 46 out of engagement with the ratchet 32 and frees the spring 33 to return the scoring mechanism to the starting point, which brings the switch arm 43 to the position shown in Figure 6.

As the motor 55 continues to rotate the cams 58 and 59 will shortly thereafter close the switches 58a and 59a and thereafter, as a result of slight further movement of the motor, the switch 57a will be opened by the movement of the cam 57 and thus it breaks the circuit through the switch of relay 63 to the motor 55 and stops the further rotation. The scoring mechanism has thus been returned to the starting position and playing can take place.

After the movement above described and with the scoring mechanism in the position of Figure 6, the ball is struck and thus the beam of light from the light source 5 to the photoelectric cell 8 is no longer interrupted and falls upon the cell, thus decreasing the resistance of the cell and causing the grid of the tube 62 to increase sufficiently in a positive direction. Thereby it energizes the relay 63 and opens its switch. At this instant the grid of the tube 68 will swing positively because of the resistor in the cathode circuit of the pentode tube 62, and thereby it actuates the relay 69 to close its left-hand switch and open its right-hand switch. This closes the power circuit of the cam motor 55 and starts the motor. The opening of the right-hand switch by the relay 69 disconnects the positive side of the timing condenser and the anode circuit of the discharge tube 64. The stored energy of the timing condenser 66 is then reduced by the flow of current through the discharge tube 64, and this discharge continues until the ball 2 produces a sound by striking the target portion 11.

When a sound is made it is picked up by the microphone 15 and the first wave of sound striking the microphone causes an electrical impulse which is amplified to be impressed on the grid of the tube 23 and causes this tube to energize the scoring clutch magnets 28 and also stops the discharge tube 64 by increasing its grid bias negatively through the resistor 73. Since the clutch is energized through one set of windings only, it will cause the synchronous motor 26 to move the moving contact of switch arm 43 on the scoring disc 36 until the potential of the timing condenser 66 is sufficiently low to cause the anode of the timing tube 65 to be positive enough to energize the stop tube 67.

The amount of stored energy left in the timing condenser 66 after discharge through the tube 64 is stopped will determine the length of time before the tube 65 functions to cause the tube 67 to conduct, and therefore will determine the length of time during which the clutch 24 will remain energized and finally the length of time during which the scoring mechanism will operate.

Figure 3:
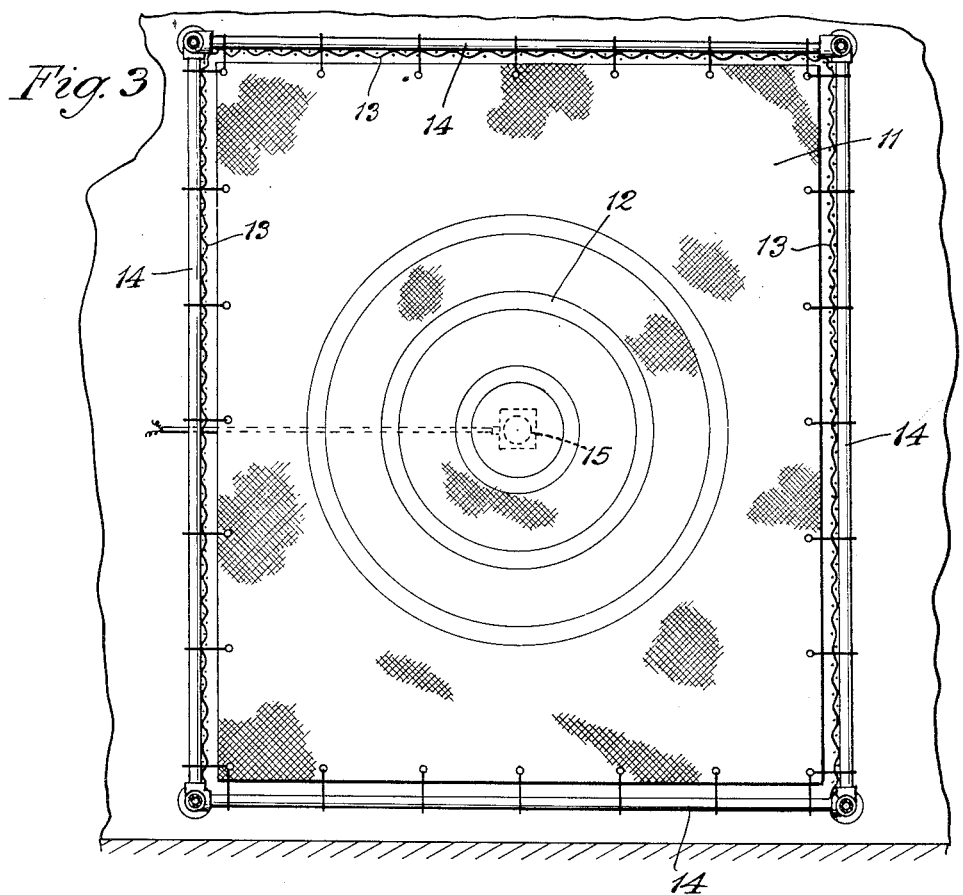
Figure 3 is a section taken on an enlarged scale at line 3—3 of Figure 2.

So long as the mechanism operates, its switch arm 43 will continue to move around and will make new contacts and light additional lights. The microphone 15 is placed in line with the center of the target or bull's eye, as shown particularly in Figure 3.

Once the ball has been driven and the resistance in the photoelectric cell has been reduced by the beam of light falling upon it, the circuits have been affected as above described and the timing condenser 66 is being discharged. If a ball is driven straight and at high speed so that it strikes the bull's eye of the target as rapidly as possible, the sounds from its impact will reach the microphone rapidly and when only a limited quantity of the charge in the timing condenser 66 has been dissipated. This then will permit a longer movement of the switch arm 43 and will cause energizing of more lights in the indicating device and will indicate a long drive. If the ball is driven slowly or is driven to strike the target at a distance from the microphone the microphone will be actuated more slowly, and therefore a greater proportion of the charge on the timing condenser 66 will have been dissipated before the microphone picks up the sound of impact of the ball on the target element.

Therefore the timing condenser 66 will have only a limited charge left with which to control the movement of the switch arm 43. For that reason where a ball is driven slowly or inaccurately, the switch arm 43 will make only a limited movement and will be able to actuate only a small number of scoring lights. Therefore, the mechanism registers accurately the distance which the ball would have traveled through free space. The target is so arranged that a ball hitting the bull's eye rapidly will be moving in the direction and at the speed which would have produced a long drive had the ball been driven free. Correspondingly, a ball driven slowly or one hitting far away from the bull's eye in the target area would not have produced as long a drive because it would have been driven in a bad direction or at a slow speed. By means of the electrical mechanism the sound of the impact of the ball reaching the microphone will accurately register the distance which such a poorly driven ball would have traveled.

Since the microphone is placed as near as possible to and directly behind the bull's eye of the target, the delay of the sound in reaching the microphone when the ball strikes the target at other points will slightly vary the amount of energy stored in the condenser 66 at the time of the stoppage of the ball. Therefore, the accuracy with which the ball is hit and the speed with which it moves will affect the score obtained. After the microphone has picked up the sound of the impact of the ball on the target, the cam motor 55 is stopped and the switches operated by the cam motor assume the position shown in Figure 5.

Practical experience with a game constructed as shown herein has established the fact that the difference in time required for the sound to pass from the point of impact to the microphone varies only slightly, no matter what part of the back stop is struck. That time variation, however, is measurable. When a ball is driven straight to the back stop it travels a shorter distance than it does when it is driven to the corner or side of the back stop, and it requires a lesser time to travel the shorter distance. The device of this invention accurately includes this difference of time in its measurement of the total time required by the ball to move from the starting point to any part of the back stop.

All voltage relations and resistor values will be calculated for the circuit and tube characteristics of any particular installations, and because the voltages are regulated on all the functional circuits, accuracy in the device itself is maintained in spite of fluctuating line voltages.

Stated generally, it may be said for purposes of illustration that our invention includes the method of utilizing the discharge of a condenser to control an indicating mechanism, in which method the discharge from the condenser is initiated when a ball is driven or projected, and in which the rate of condenser discharge is radically changed when the ball strikes a back stop. After the ball has struck the back stop and the rate of condenser discharge has been radically changed by being greatly reduced in speed, the further condenser discharge initiates and controls the operation of a distance indicating mechanism. The final distance indicated is dependent upon the energy remaining in the condenser at the time that the sound of the impact of the ball on the back stop is impressed upon a microphone which then initiates an action radically reducing the speed of condenser discharge.

We claim:

1. In combination in a scoring mechanism, means defining a target and means defining a position from which a counter is to be moved by a player, a microphone positioned centrally behind the target, an electrical scoring mechanism, a light source and a photoelectric cell positioned to be contacted by light moving therefrom, said position defining means being located between the light source and the photoelectric cell so that a counter may be positioned initially to interrupt said beam of light, and an electrical network including conductors operatively connecting the photoelectric cell and the scoring mechanism in circuit, and including electric timing means together with means comprising a condenser for initiating operation thereof concurrently with movement of the counter from a position obstructing the passage of light from said light source to said photoelectric cell, means for microphonically generating an electric impulse in response to the impact of the counter on said target, electrical means responsive to said impulse for electrically stopping operation of the timing means and for simultaneously starting operation of said scoring means and electrical means for terminating operation of the scoring means after an interval of time, the duration of which is a function of the period of time during which the timing means was in operation.

2. In combination in a scoring mechanism, means defining a target and means defining a position from which a counter is to be moved by a player, a microphone positioned centrally behind the target, an electrical scoring mechanism, a light source and a photoelectric cell positioned to be contacted by light moving therefrom, said position defining means being located between the light source and said photoelectric cell so that a counter may be positioned initially to interrupt said beam of light, and an electrical network including conductors operatively connecting the photoelectric cell and said scoring mechanism in circuit, and including electric timing means together with means comprising a condenser for initiating operation thereof concurrently with movement of the counter from a position obstructing the passage of light from said light source to said photoelectric cell, means for microphonically generating an electric impulse in response to the impact of the counter on said target, means responsive to said impulse for stopping operation of the timing means and for simultaneously starting operation of said scoring means, and means for terminating operation of the scoring means after an interval of time, the duration of which is a function of the period of time during which the timing means was in operation, said scoring mechanism including means for indicating said time interval in terms of distance representing the length of free flight of the counter had it not been stopped by said target.

3. In combination in a scoring mechanism, means defining a target and means defining a position from which a counter is to be moved by a player, a microphone positioned centrally behind and close to the target, an electrical scoring mechanism, a light source and a photoelectric cell positioned to be contacted by light moving therefrom, said position defining means being located between the light source and the photoelectric cell so that a counter may be positioned initially to interrupt the beam of light from said source upon said photoelectric cell, and an electrical network including conductors operatively connecting the photoelectric cell and the scoring mechanism in circuit and including an electric condenser with means for charging same, means for initiating controlled discharge of the condenser coincident with movement of the counter from said position determining means, means responsive to an electric impulse picked up by the microphone upon impact of the counter with the target for terminating the discharge of the condenser and for simultaneously initiating operation of the scoring mechanism, and means for maintaining the scoring mechanism in operation for a period of time corresponding functionally to the charge remaining on the condenser when the discharge thereof was terminated.

4. In combination in a scoring mechanism, means defining a target and means defining a position from which a counter is to be moved by a player, a microphone positioned centrally behind and close to the target, an electrical scoring mechanism, a light source and a photoelectric cell positioned to be contacted by light moving therefrom, said position defining means being located between the light source and said photoelectric cell so that a counter may be positioned initially to interrupt the beam of light from said source upon the photoelectric cell, and an electrical network including conductors operatively connecting the photoelectric cell and the scoring mechanism in circuit, and including an electric condenser with means for charging same, means for initiating controlled discharge of the condenser coincident with movement of the counter from said position determining means, means responsive to an electric impulse picked up by the microphone upon impact of the counter with the target for terminating the discharge of the condenser and for simultaneously initiating operation of the scoring mechanism, and electrical means for maintaining the scoring mechanism in operation for a period of time corresponding functionally to the charge remaining on the condenser when the discharge thereof was terminated, said scoring mechanism including electrical means for visually indicating the length of the free flight of the counter had it not been stopped by the target.

5. In combination in a scoring mechanism, a player's station, a target, a scoring means, a first electric impulse-generating means operatively associated with the player's station, and a second electric impulse-generating means operatively associated with said target, an electric network operatively connecting the scoring means and the first and second electric impulse-generating means, said electric network including a condenser, charging means therefor, and a discharge timing circuit for said condenser, means for placing a predetermined charge on said condenser, said first electric impulse-generating means including means responsive to the projection of a ball from said player's station to transmit from said first electric impulse-generating means an electric impulse within said electric network, means in said electric network operative in response to said electric impulse to initiate discharge of said condenser through said condenser discharge timing circuit, said second electric impulse-generating means including means responsive to the impact of a ball on said target to transmit from said second electric impulse-generating means a second electric impulse within said electric network, means responsive to said second electric impulse to terminate the discharge of the condenser through said condenser discharge timing circuit and simultaneously to initiate operation of said scoring means and means for terminating operation of said scoring means after an interval of time, the duration of which is a function of the charge remaining in the condenser.

JOHN T. CLARK.
OLIVER J. SCHOMMER.

REFERENCES CITED

The following references are of record in the file of this patent:

UNITED STATES PATENTS

| Number | Name | Date |
|---|---|---|
| 2,102,166 | Roberts | Dec. 14, 1937 |
| 2,174,804 | Neville | Oct. 3, 1939 |
| 2,177,569 | Jorgensen et al. | Oct. 24, 1939 |
| 2,301,195 | Bradford | Nov. 10, 1942 |
| 2,314,063 | Anderson et al. | Mar. 16, 1943 |
| 2,329,504 | Young | Sept. 14, 1943 |